United States Patent [19]
Chandler et al.

[11] Patent Number: 5,856,773
[45] Date of Patent: Jan. 5, 1999

[54] CIRCUIT PROTECTION DEVICE

[75] Inventors: Daniel A. Chandler, Menlo Park; Johnny Lam, Fremont, both of Calif.

[73] Assignee: Raychem Corporation, Menlo Park, Calif.

[21] Appl. No.: 743,274

[22] Filed: Nov. 4, 1996

[51] Int. Cl.[6] .................................................. H01C 7/10
[52] U.S. Cl. ........................ 338/22 R; 429/7; 429/62; 429/65
[58] Field of Search ........................... 338/22 R, 22 SD; 361/106; 429/7, 62, 65; 320/107, 112

[56] References Cited

U.S. PATENT DOCUMENTS

| | | | |
|---|---|---|---|
| 3,467,937 | 9/1969 | Norton | 338/219 |
| 3,689,736 | 9/1972 | Meyer | 219/222 |
| 3,783,030 | 1/1974 | Tietze | 136/134 P |
| 4,255,698 | 3/1981 | Simon | 320/35 |
| 4,404,463 | 9/1983 | Eder et al. | 219/541 |
| 4,570,055 | 2/1986 | McMills | 219/541 |
| 4,861,966 | 8/1989 | Matthiesen et al. | 219/205 |
| 4,878,038 | 10/1989 | Tsai | 337/107 |
| 4,973,936 | 11/1990 | Dimpault-Darcy et al. | 338/32 R |
| 5,089,801 | 2/1992 | Chan et al. | 338/22 R |
| 5,204,194 | 4/1993 | Miller et al. | 429/7 |
| 5,212,466 | 5/1993 | Yamada et al. | 338/22 R |
| 5,293,297 | 3/1994 | Desai | 361/106 |

FOREIGN PATENT DOCUMENTS

| | | | |
|---|---|---|---|
| 0 384 204 | 8/1990 | European Pat. Off. | H01M 2/34 |
| 4-75287 | 10/1992 | Japan . | |
| 5-109505 | 4/1993 | Japan | H01C 7/02 |
| WO 97/06538 | 2/1997 | WIPO . | |

OTHER PUBLICATIONS

Translation of WO 97/06538.
Search Report for International Application No. PCT/US97/20913.
Abstracts of Japan, vol. 095 No. 006, Jul. 31, 1995 (abstract for Japanese Publication No. 07–065856, Mar. 10, 1995).

*Primary Examiner*—Michael L. Gellner
*Assistant Examiner*—Karl Easthom
*Attorney, Agent, or Firm*—Marguerite E. Gerstner; Herbert G Burkard

[57] ABSTRACT

A PTC device suitable for attachment to a terminal of a battery. The device contains a PTC component which has a shape with an outer periphery and an inner periphery which defines a first opening in the center of the PTC component. The PTC component is made from a laminar PTC resistive element which is composed of a PTC conductive polymer composition, a first laminar electrode which is attached to a first face of the resistive element, and a second laminar electrode which is attached to a second opposite face of the resistive element. Also part of the device are a first conductive lead which has a first part which is attached to the first electrode, and a second part which extends into the first opening, and a second conductive lead. The second conductive lead has a first part which is attached to the second electrode, lies within the outer periphery of the PTC component in a plane, and defines a second opening which at least partially overlies the first opening, and a second part which is attached to the first part of the second lead, extends away from the inner periphery of the PTC component toward the opening, and can be bent out of the plane of the first part of the second lead away from the first conductive lead. When the second part of the second lead is bent out of the plane, it allows a welding instrument to be inserted into the opening created, thus allowing direct welding of the device to the terminal.

16 Claims, 4 Drawing Sheets

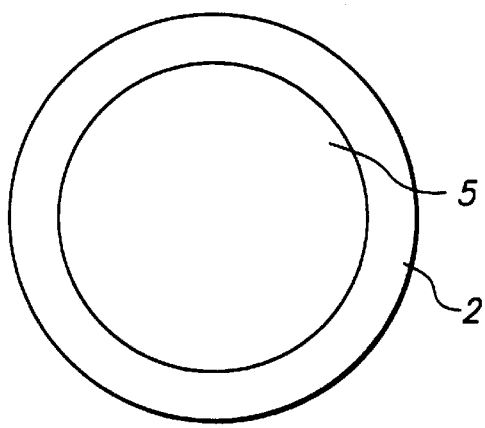
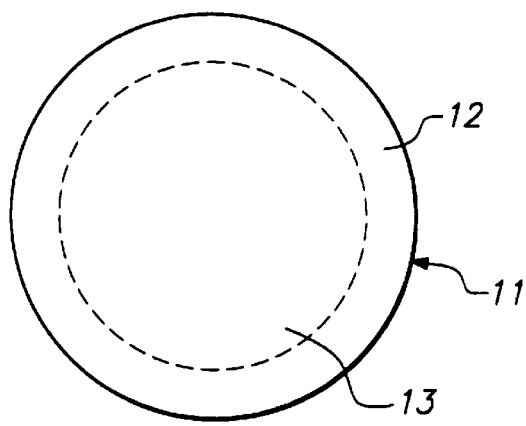
FIG. 3  FIG. 4
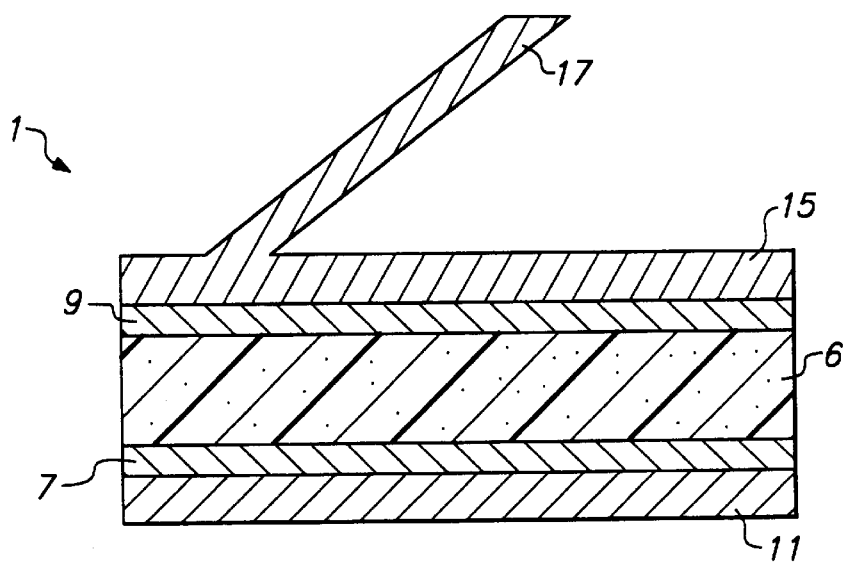
FIG. 5

CIRCUIT PROTECTION DEVICE

BACKGROUND OF THE INVENTION

1. Field of invention

This invention relates to circuit protection devices for use in battery protection.

2. Introduction to the Invention

The use of a PTC circuit protection device to protect a battery from overcurrent and overtemperature conditions is well-known. See, for example, U.S. Pat. Nos. 4,255,698 (Simon) and 4,973,936 ((Dimpault-Darcy et al), Japanese Utility Model Application No. 4-75287 (filed Oct. 29, 1992), and International Application No. PCT/JP96/02205 (filed Aug. 6, 1996), the disclosures of which are incorporated herein by reference. In these applications, a device which exhibits a positive temperature coefficient of resistance (PTC behavior) is connected in series with a battery terminal. During normal operation the PTC device is in a low resistance, low temperature condition. On exposure to a very high current which may develop, for example, due to a short circuit, or exposure to a high temperature which may develop, for example, during excessive charging, the device switches into a high resistance, high temperature condition, thus decreasing the current through the battery to a low level and protecting any components in electrical contact with the battery.

PTC devices are commonly installed in battery packs which comprise a plurality of batteries. Such battery packs are designed for use with electrical equipment such as cameras, video recorders, tools, and portable computers. It is desirable to make the battery packs as small and lightweight as possible, but still provide adequate protection in the event of a short circuit. One technique to maximize the use of space in the battery pack is to place the PTC device directly onto the button terminal (i.e. the positive terminal) of the battery. If the device is in the form of a disk or other element with a central hole, the hole can be sized to allow it to be placed over the button terminal. Electrical connection is then made from an electrode on one surface of the disk to the button terminal and from an electrode on the opposite surface of the disk to a second battery. In the design described in Japanese Utility Model Application No. 4-75287 a cap fits over the button terminal and makes electrical contact to it. The PTC device fits over the cap. A second connection is then made from the top surface of the PTC device to a second battery. With this design it is necessary to avoid a possible short circuit between the cap and the inside surface of the central hole of the PTC device and so an insulating ring must be inserted. In addition, if the cap is made large enough to fit easily over the button terminal, it may be too large to actually fit tightly during the life of the battery pack. The design described in International Application No. PCT/JP96/02205 provides a disk-shaped PTC device attached to first and second conductive leads. One of the leads covers essentially the entire surface of the PTC device, including the opening of the disk; the second lead covers part of the opposite side of the disk and extends away from the outer periphery of the disk. The second lead can be bent to make electrical contact to a second battery. In this design, it is necessary to provide an insulating layer to cover the inner periphery of the PTC device so as to prevent electrical shorting of the device by the button terminal. In order to accommodate the insulating layer, the opening of the disk may have to be made larger than is desirable. Furthermore, PTC devices with different size openings are required for different types of batteries.

SUMMARY OF THE INVENTION

The devices of the prior art are generally designed to be attached to the positive terminal of a battery, and incorporated into the internal design of the battery cell. In some instances, however, there may be insufficient space within the standard sized battery for insertion of a PTC device. Furthermore, it is sometimes desirable to attach the device to the external surface of the cell, especially to the minus terminal of the battery. This allows end-to-end butt attachment of two cells, e.g. a series connection of the negative end of a first battery to the positive end of the second battery. We have found that a design in which one lead can be bent into a variety of positions in order to allow direct welding of a second lead onto a terminal of a second battery, often the minus terminal of that battery, provides a simple, cost-effective means of attaching a device in a form-fitting profile, without the need to insulate the inner periphery of the device or apply a lead that extends beyond the periphery of the device. In a first aspect this invention provides a PTC device suitable for attachment to a terminal of a battery, said device comprising (A) a PTC component which (1) has a shape with (a) an outer periphery and (b) an inner periphery which defines a first opening in the center of the PTC component, and (2) comprises (i) a laminar PTC resistive element which is composed of a PTC conductive polymer composition, (ii) a first laminar electrode which is attached to a first face of the resistive element, and (iii) a second laminar electrode which is attached to a second opposite face of the resistive element;

(B) a first conductive lead which comprises (1) a first part which is attached to the first electrode, and (2) a second part which extends into the first opening; and (C) a second conductive lead which comprises (1) a first part which (a) is attached to the second electrode, (b) lies within the outer periphery of the PTC component in a plane, and (c) defines a second opening which at least partially overlies the first opening, and (2) a second part which (a) is attached to the first part of the second lead, (b) extends away from the inner periphery of the PTC component toward the first opening, and (c) can be bent out of the plane of the first part of the second lead away from the first conductive lead.

In a second aspect, this invention provides a battery assembly which comprises (I) a battery which comprises first and second terminals; and (II) a PTC device according to the first aspect of the invention, said PTC device having been placed in contact with the first terminal of the battery so that the first conductive lead is in physical and electrical contact with that terminal.

Devices of the invention are particularly useful for direct welding onto the terminal of a battery. Thus, in a third aspect, this invention provides a method of attaching a PTC device of the first aspect of the invention to a battery terminal, said method comprising (I) positioning the first conductive lead in contact with a first terminal of the battery;

(II) bending the second part of the second conductive lead out of the plane of the first part of the second lead away from the first conductive lead to create a space sufficiently large for insertion of a welding instrument;

(III) inserting the welding instrument; and (IV) welding the device to the first terminal.

BRIEF DESCRIPTION OF THE DRAWINGS

The invention is illustrated by the drawings in which

FIG. 3 is a top view of a PTC component which is part of the PTC device of the invention;

FIG. 4 is a top view of first conductive lead which is part of the PTC device of the invention;

FIG. 5 is a cross-sectional view of the device of FIG. 1 with second conductive lead bent into position for installation onto a battery;

DETAILED DESCRIPTION OF THE INVENTION

Figure 1:
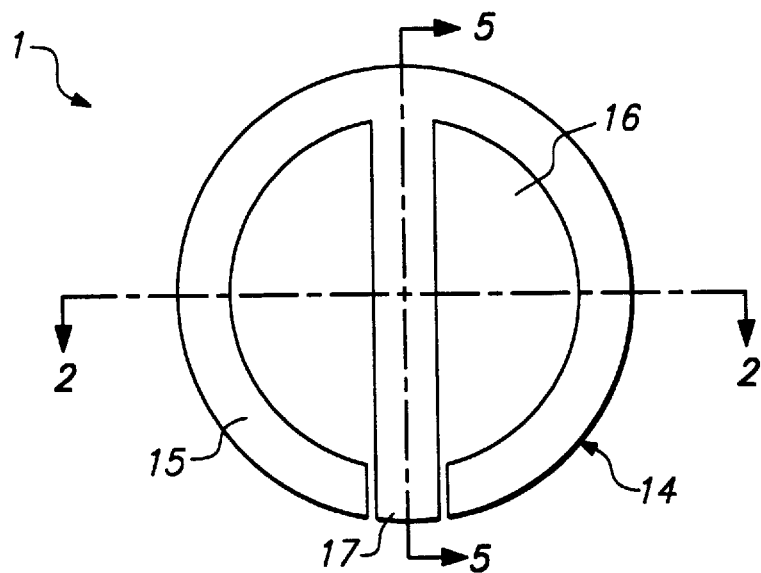
FIG. 1 is top view of a PTC device of the invention.

The PTC device of the invention comprises a PTC component which is attached to first and second conductive leads. The PTC component comprises a laminar resistive PTC element which is composed of a conductive material which exhibits PTC behavior. In this application, the term "PTC" is used to mean a composition or device which exhibits positive temperature coefficient of resistance and has an $R_{14}$ value of at least 2.5 and/or an $R_{100}$ value of at least 10, and it is preferred that the composition or device should have an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. Generally the compositions used in devices of the invention which exhibit PTC behavior show increases in resistivity which are much greater than those minimum values. The conductive material may be a ceramic, e.g. $BaTiO_3$, but is preferably a conductive polymer in which a particulate filler is dispersed in a polymer component. The polymeric component preferably is an organic crystalline polymer, e.g. a polyolefin such as polyethylene or an ethylene copolymer; a fluoropolymer such as polyvinylidene fluoride; or a blend of two or more polymers. The particulate conductive filler may comprise carbon black, graphite, metal, metal oxide, conductive coated glass, powdered conductive polymer, or a combination of these fillers. Other components, e.g. antioxidants, inert fillers, or stabilizers, may be present. The conductive polymer may be crosslinked, e.g. by irradiation or chemical means. For most applications, the conductive polymer composition has a resistivity of less than 100 ohm-cm, preferably less than 20 ohm-cm, particularly less than 10 ohm-cm, more particularly less than 5 ohm-cm, especially less than 2 ohm-cm, e.g. less than 1 ohm-cm.

The laminar resistive element is attached to first and second laminar electrodes which are attached to the first face and the second face, respectively, of the resistive element. It is preferred that the conductive polymer composition be extruded or otherwise formed into a sheet onto which the electrodes may be attached to form a laminate, i.e. the conductive polymer is sandwiched between the foils. Both first and second electrodes comprise a conductive material, and are preferably metal in the form of a foil, e.g. nickel, copper, brass, stainless steel, or an alloy of one or more of these metals, although one or both of the electrodes may comprise a conductive paint or graphite layer. A tie layer, e.g. a conductive adhesive, may be used to attach the electrode to the resistive element. It is particularly preferred that the first and second electrodes comprise an electrodeposited metal foil, e.g. nickel, copper, or nickel-coated copper.

The PTC component has a shape with an outer periphery and an inner periphery which defines a first opening in the PTC component, preferably in the center of the PTC component. The PTC component may have any appropriate shape, in order to meet size constraints for the battery. For example, the PTC component may be round (i.e. a disk shape), square, or rectangular. The first opening may be of any shape, but is preferably of the same general shape as the PTC component, e.g. a disk-shaped PTC component preferably has a circular-shaped first opening. For ease of assembly, the first opening is generally large enough to accommodate the tip of a welding tool. In a preferred process, the PTC component is punched, diced, cut, or otherwise separated from the laminate in the appropriate shape.

A first conductive lead is attached to the first electrode, and comprises a first part which is attached to the first electrode, and a second part which extends into the first opening. The second part may extend across the first opening, essentially completely covering the first opening, or it may be in the form of a finger extending partially into or fully across the first opening.

Also part of the PTC device is a second conductive lead comprising a first part and a second part. The first part is attached to the second electrode and lies within the outer periphery of the PTC component in a plane. For some applications, it is preferred that the first part also lie within the inner periphery of the PTC component, although for other applications it is possible that the first part extends beyond the inner periphery of the PTC component into the first opening. The first part defines a second opening which at least partially overlies the first opening, and preferably is substantially the same as the first opening over at least 50% of the periphery of the first opening. In a preferred embodiment, the first and second openings are the same size (when the second part of the second conductive lead is bent out of the plane of the first part, as described below), and substantially overlap.

The second part of the second conductive lead is attached to the first part of the second lead, e.g. by means of a weld, solder, a rivet, or other means, or because the first and second parts of the second lead comprise a unitary element, i.e. one cut or stamped as a single unit from an appropriate material. The second part extends away from the inner periphery of the PTC component and is often completely contained within the outer periphery, i.e. the second part does not extend beyond the outer periphery. The second part is preferably in the form of a tab, finger, or other element that can be bent out of the plane of the first part of the second lead, away from the first conductive lead. This bending can be similar to that of a pull-tab on a can, allowing the tab, when bent, to be positioned at right angles to the plane. When bent in this way, at least a section of the second part of the first lead is exposed, allowing insertion of and positioning of a welding tool adjacent the first lead. For some applications it is preferred that the second part extend beyond the outer periphery. This allows bending of the second part, e.g. 180°, to reach a second battery positioned adjacent to the first battery and allows electrical connection to be made.

Both the first and second leads comprise a conductive material, preferably nickel, stainless steel, copper, steel, or a metal alloy. The attachment of the leads to the respective electrode may be made by means of solder, a weld, or conductive adhesive or other suitable means, or, in some cases, mere contact between the appropriate electrode and the lead directly or indirectly (e.g. by means of solder or a conductive adhesive). If solder is used, a solder paste can be applied between the lead and the electrode, and can then be reflowed by means of hot air or a reflow oven. The first and second leads may have the same shape so that the PTC device can be inserted on either surface.

The PTC device generally has a resistance at 20° C. of less than 10 ohms, preferably less than 1 ohm, particularly less than 0.5 ohm, especially less than 0.25 ohms, e.g. 0.005 to 0.150 ohm.

PTC devices of the invention can be used in a battery assembly. The assembly comprises at least one battery which has first and second terminals, where the first terminal can be the positive terminal or the negative terminal, and the second terminal is the opposite polarity. Often, especially in the case of battery packs, there are a plurality of batteries (i.e. at least two, and generally more than two) connected in series with one another. Each of the batteries in the assembly has a first and a second terminal. In the assembly, the PTC device is placed in contact with the first terminal so that the first conductive lead is in physical and electrical contact with that terminal. If there is a plurality of batteries in the assembly, each battery may be attached to a PTC device, or there may be a single PTC device for the entire assembly. Often, the first conductive lead is in physical and electrical contact with the first terminal of the first battery, and the second part of the second conductive lead is in physical and electrical contact with the second terminal of the second battery. For ease of assembly, the PTC device is often attached to the first terminal by welding. Welding is particularly suitable when the first terminal is flat (i.e. not a button terminal), and the first conductive lead can be easily positioned onto this flat surface. Often this flat terminal is the minus terminal of the battery.

The battery may be any type of battery, e.g. nickel-cadmium, nickel-hydride, alkaline, or lithium, and it is particularly preferred that the PTC device be used with a "AAA" size or "AA" size battery or a prismatic battery, i.e. one which has a square or rectangular shape.

The device of the invention can also be used in a method to attach it to a battery terminal. This method comprises the steps of positioning the first conductive lead in contact with a first terminal of the battery, bending the second part of the second conductive lead out of the plane of the first part of the second lead away from the first conductive lead to create a space sufficiently large for insertion of a welding instrument, inserting the welding instrument into the space, and welding the device to the first terminal. The bending step can be performed either before or after the step of positioning the device in contact with the terminal. The space which is created by bending the first part of the second lead is preferably equivalent to the first opening. The welding instrument described here is preferably the tip of a welding tool. The method can also provide a step by which the second part of the second conductive lead is attached to a terminal of a second battery.

Figure 2:
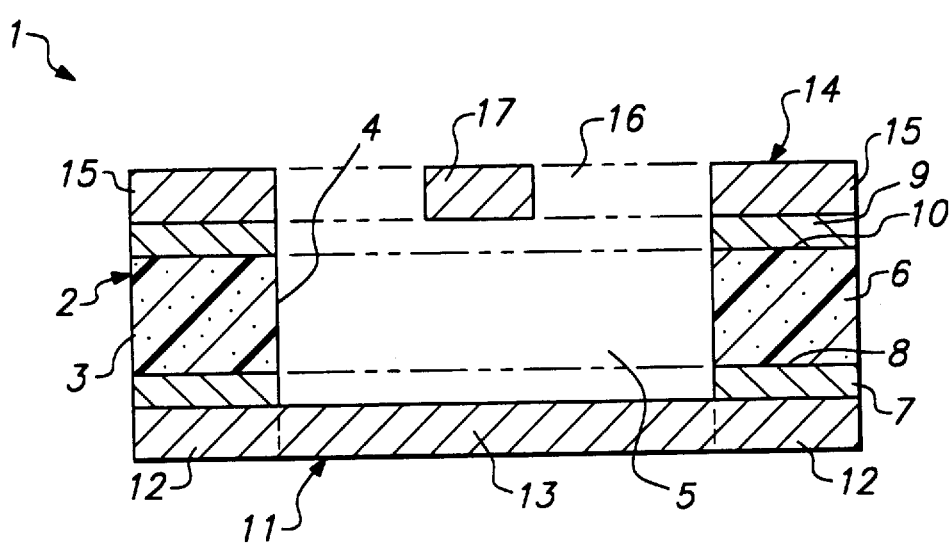
FIG. 2 is a cross-sectional view of the device of FIG. 1 along line 2—2.

The invention is illustrated in the drawings in which FIG. 1 is a top view of PTC device 1 of the invention and FIG. 2 is a cross-sectional view along line 2—2 of FIG. 1. PTC component 2, shown here in the shape of a disk, has an outer periphery 3 and an inner periphery 4 which define a first opening 5 in the center of PTC device 1. Laminar resistive element 6, which is generally composed of a conductive polymer composition, is attached to first laminar electrode 7 on first face 8, and to second laminar electrode 9 on second face 10. Attached to first laminar electrode 7 is first conductive lead 11, in which first part 12 is attached to first laminar electrode 7 and second part 13 extends into first opening 5. As shown, second part 13 extends across entire first opening 5. Second conductive lead 14 also comprises at least two parts: first part 15 which is attached to second electrode 9, which lies within outer periphery 3 and defines second opening 16, and second part 17 which is attached to first part 15 and extends away from inner periphery 4 toward second opening 16. Second opening 16, as shown, entirely overlaps first opening 5, but in some embodiments, the periphery of opening 16 may be smaller or larger than inner periphery 4.

FIGS. 3 and 4 are top view of components of PTC device 1: PTC component 2 is shown in FIG. 3 and first conductive lead 11 is shown in FIG. 4.

FIG. 5 is a cross-sectional view along line 5—5 of FIG. 1, when second part 17 of second conductive lead 14 is bent out of the plane of first part 15 of second conductive lead 14. This bending increases the effective size of second opening 16 and makes it possible to easily access first conductive lead 11.

Figure 6:
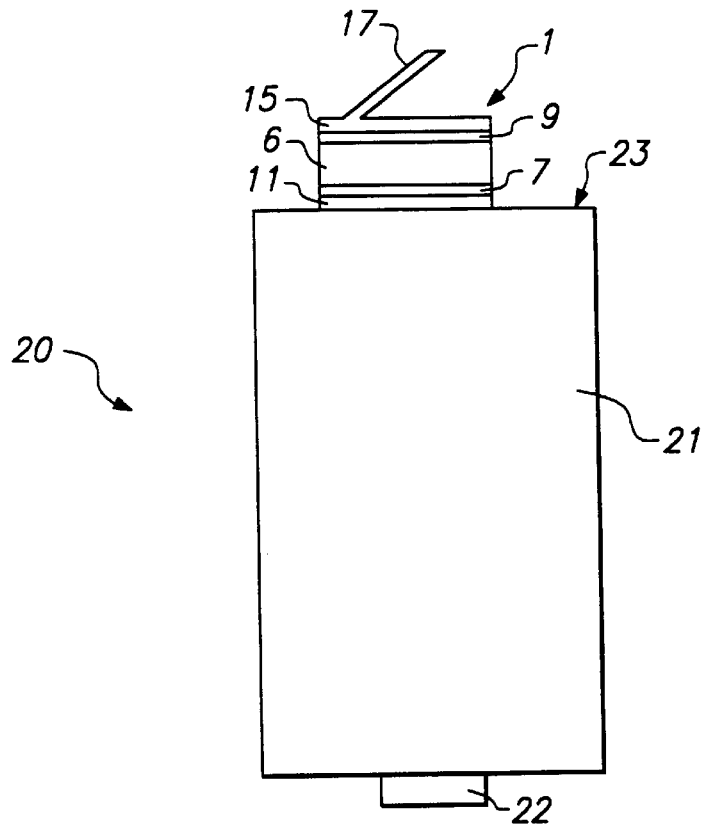
FIG. 6 is a schematic view of a battery assembly of the invention in which a PTC device of the invention is in contact with a battery.

FIG. 6 is a schematic view of a battery assembly 20 of the invention. Battery 21, which has first terminal 22 and second terminal 23, is in direct contact with PTC device 1 at second terminal 23. Second part 17 of second conductive lead 14 is shown as bent out of its original plane so as to enhance attachment of PTC device 1 onto second terminal 23.

Figure 7:
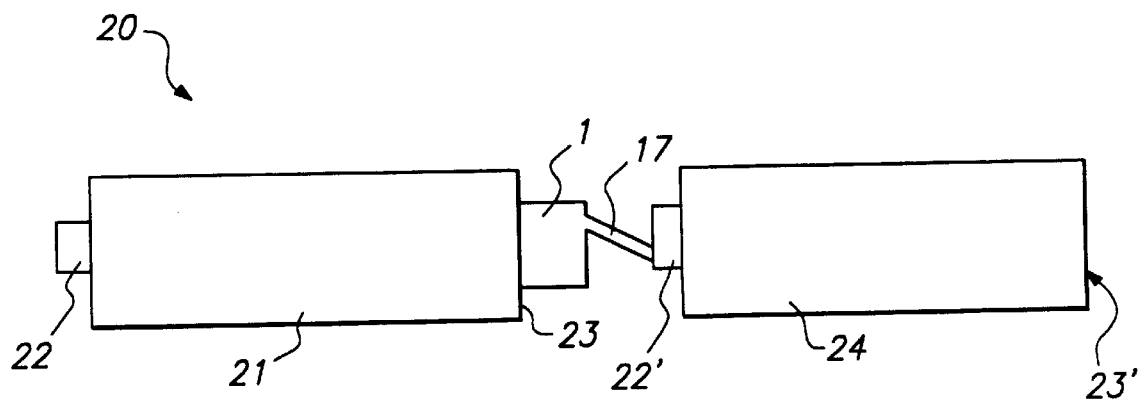
FIG. 7 is another battery assembly of the invention.

FIG. 7 also is a schematic view of a battery assembly 20. In this assembly, first battery 21 is electrically connected to second battery 24 by means of PTC device 1 which is electrically connected from second terminal 23 of first battery 21 to first terminal 22' of second battery 24. (Second terminal 23' of second battery 24 is also shown.) The current flow is thus in series from first battery 21 to second battery 24 through PTC device 1.

Figure 8:
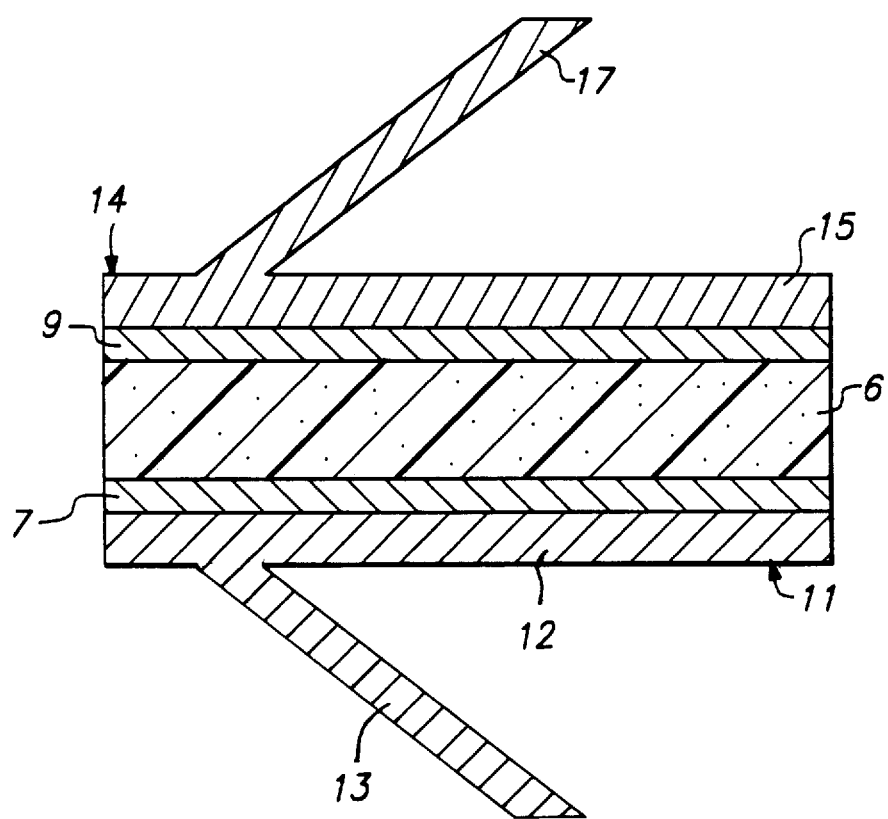
FIG. 8 is a cross-sectional view of another device of the invention.

Figure 8 is a cross-sectional view of another device of the invention in which first conductive lead 11 and second conductive lead 14 have the same shape, i.e. the shape shown for second conductive lead 14 in FIGS. 1 and 2. Second part 13 of first conductive lead 11 has the same shape as second part 17 of second conductive lead 14, and can be bent out of its original plane to allow attachment of the device to a battery on either side of the device.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extend appropriate, in the context of another figure, in combination with another feature, or in the invention in general.

What is claimed is:

1. A PTC device suitable for attachment to a terminal of a battery, said device comprising
    (A) a PTC component which (1) has a shape with (a) an outer periphery and (b) an inner periphery which defines a first opening through [in] the center of the PTC component, and (2) comprises (i) a laminar PTC resistive element which is composed of a PTC conductive polymer composition,
(ii) a first laminar electrode which is attached to a first face of the resistive element, and
(iii) a second laminar electrode which is attached to a second opposite face of the resistive element;
(B) a first conductive lead which comprises (1) a first part which is attached to the first electrode, and (2) a second part which extends into a plane below the first opening; and
(C) a second conductive lead which comprises
 (1) a first part which (a) is attached to the second electrode, (b) lies within the outer periphery of the PTC component in a plane, and (c) defines a second opening which at least partially overlies the first opening, and
 (2) a second part which (a) is attached to the first part of the second lead, (b) extends away from the inner periphery of the PTC component into a plane above the first opening, (c) can be bent out of the plane of the first part of the second lead away from the first conductive lead, and (d) lies within the outer periphery of the PTC component.

2. A device according to claim 1 wherein the PTC resistive element and the first and second electrodes have been cut from a laminate comprising two metal foils and, sandwiched between the foils, a layer of the PTC conductive polymer composition.

3. A device according to claim 1 wherein the first and second leads comprise nickel, stainless steel, copper, steel, or an alloy.

4. A device according to claim 1 wherein the shape of the PTC component is a disk.

5. A device according to claim 1 wherein the first and second parts of the second lead comprise a unitary element.

6. A device according to claim 1 wherein the conductive polymer comprises a crystalline polymer and dispersed therein a particulate conductive filler.

7. A device according to claim 1 wherein the first and second openings are the same size and substantially overlap.

8. A device according to claim 1 wherein the second part of the first lead extends across the first opening.

9. A device according to claim 1 wherein the first and the second conductive leads have the same shape.

10. A battery assembly which comprises
(I) a battery which comprises first and second terminals; and
(II) a PTC device which comprises
 (A) a PTC component which (1) has a shape with (a) an outer periphery and (b) an inner periphery which defies a first opening through the center of the PTC component, and (2) comprises
  (i) a laminar PTC resistive element which is composed of a PTC conductive polymer composition,
  (ii) a first laminar electrode which is attached to a first face of the resistive element, and
  (iii) a second laminar electrode which is attached to a second opposite face of the resistive element;
 (B) a first conductive lead which comprises (1) a first part which is attached to the first electrode, and (2) a second part which extends into a plane below the first opening; and
 (C) a second conductive lead which comprises
  (1) a first part which (a) is attached to the second electrode, (b) lies within the outer periphery of: the PTC component in a plane, and (c) defines a second opening which at least partially overlies the first opening, and
  (2) a second par which (a) is attached to the first part of the second lead, (b) extends away from the inner periphery of the PTC component into a plane above the first opening, (c) can be bent out of the plane of the first part of the second lead away from the first conductive lead, and (d) lies within the outer periphery of the PTC component,
 said PTC device having been placed in contact with the first terminal of the battery so that the first conductive lead is in physical and electrical contact with said first terminal.

11. An assembly according to claim 10 wherein the battery is a nickel-cadmium battery, a nickel-hydride battery, or a lithium battery.

12. An assembly according to claim 10 wherein the first terminal is a negative terminal.

13. An assembly according to claim 10 which comprises at least two batteries, each of which comprises first and second terminals, wherein the first conductive lead is in physical and electrical contact with the first terminal of one battery and the second part of the second conductive lead is in physical and electrical contact with the second terminal of the second battery.

14. An assembly according to claim 10 wherein the first conductive lead has been welded to one of said first and second terminals and wherein the second part of the second lead extends from one battery to a second battery.

15. An assembly according to claim 14 wherein the first conductive lead has been welded to the first terminal which is a negative terminal.

16. A device according to claim 1 wherein the resistive clement, the first electrode, and the second electrode each have the same outer periphery and inner periphery as the PTC component.

* * * * *

UNITED STATES PATENT AND TRADEMARK OFFICE

CERTIFICATE OF CORRECTION

PATENT NO. : 5,856,773

INVENTOR(S) : Chandler et al.

DATED : January 5, 1999

It is certified that error appears in the above-identified patent and that said Letters Patent is hereby corrected as shown below:

Column 5, line 12, replace "ohms" by --ohm--.

Claim 1, line 5, delete "|in|".

Claim 10, line 7, replace "defies" by --defines".

Claim 10, line 21, replace "of:" by --of--.

Claim 10, line 25, replace "par" by --part--.

Claim 16, line 2, replace "clement" by --element--.

Signed and Sealed this

Fourth Day of May, 1999

Attest:

*Attesting Officer*

Q. TODD DICKINSON

*Acting Commissioner of Patents and Trademarks*